United States Patent [19]

Galdes

[11] Patent Number: 4,471,749
[45] Date of Patent: Sep. 18, 1984

[54] COLLAPSIBLE BARBECUE UNIT

[76] Inventor: Emanuel Galdes, 1130 Channing Ave., Palo Alto, Calif. 94301

[21] Appl. No.: 431,453

[22] Filed: Sep. 30, 1982

[51] Int. Cl.³ .............................................. F24C 1/16
[52] U.S. Cl. .................................. 126/9 R; 126/25 R; 220/8
[58] Field of Search ................... 126/9 R, 9 B, 25, 29, 126/38; 220/8, 94 A, 95

[56] References Cited

U.S. PATENT DOCUMENTS

| 2,517,254 | 4/1947 | Steele | 126/9 R |
| 3,892,222 | 7/1975 | Darbo | 126/29 |
| 4,062,340 | 12/1977 | Huff | 126/25 R |
| 4,069,806 | 1/1978 | Landry | 126/9 |

Primary Examiner—Larry Jones
Assistant Examiner—Noah Kamen
Attorney, Agent, or Firm—Townsend and Townsend

[57] ABSTRACT

A barbecue unit having a lower, open top member and a cover for placement over the lower member in either one or two locations. In a first, stored location, the cover is collapsed on the lower member so that, together, they require only a minimum amount of space for storage. In the second position, the cover overlies the open top of the lower member and the sides of the cover are supported by rigid bars on the upper, opposed sides of the lower member. A grill on the open top of the lower member thus can support food items to be barbecued, and the space above the grill and below the cover can be used to collect smoke for smoking the food items. The bars on the lower member are pivotally mounted thereon so that they can be retracted to allow the cover to be collapsed on the lower member for storage purposes. A number of pivotally mounted legs on the lower member support the same above a support surface and the lower member has a lower, inner grill for supporting charcoal briquettes.

4 Claims, 4 Drawing Figures

COLLAPSIBLE BARBECUE UNIT

BACKGROUND OF THE INVENTION

The present invention is directed to improvements in barbecue units, specifically to a barbecue unit which must be stored in a confined space yet still has the capability of smoking food items which are barbecued on the unit itself.

In conventional barbecue units, the configurations of such units are such that it difficult to store them in a limited space, such as in corners of utility regions or on shelves. The reason for this is that most barbecue units are circular in configuration and are unwieldy to handle as well as store in a location of limited size. Disclosure of prior barbecue units are found in U.S. Pat. Nos. 3,005,451, 3,081,692, 3,088,393, 3,667,446 and 3,851,639.

Because of the storage limitations of conventional barbecue units, a need has arisen for an improved barbecue unit which is not only easy to store but easy to use.

SUMMARY OF THE INVENTION

The present invention fills the aforesaid need by providing an improved barbecue unit which is constructed so that it can be quickly and easily stored yet the barbecue unit has a cover which can be situated on the lower part of the barbecue unit so that a smoking region can be formed by the cover immediately above the grill supporting the food items on the lower member. The cover and lower member are complemental to each other so that the cover can be telescoped onto the lower member; thus, the cover and member require only a minimum of space for storage. Also, since the cover is on the lower member during storage, it can protect the lower member and the grill on the lower member from damage.

The barbecue unit of the present invention has a pair of side bars or brackets on the upper margin of the lower member, and these bars can be moved from retracted positions permitting the cover to telescope over the lower member to operative positions in which the bars present flanges for supporting the cover. Thus, the sides of the cover extend upwardly from the upper margin of the lower member to present a closed space above the grill at the upper margin of the lower member. This closed space can be used for collecting smoke to smoke the food items on the grill.

Other features of the barbecue unit include the pivotal legs on the lower margin of the lower member so that the lower member can be operated with the bottom surface thereof spaced above a support surface, such as the ground. The legs are pivotally mounted for movement into retracted position so that the bottom of the lower member can rest directly on a support surface, such as a shelf for storage. Generally, the lower member and cover are rectangular in shape to minimize the space needed for storage yet the lower member and cover can be of other shapes, if desired, without substantially increasing the space required for storage or without rendering the barbecue unit unwieldy for handling.

The primary object of the present invention is to provide an improved barbecue unit which is constructed so that it needs only a minimum amount of space for storage yet the barbecue unit has a cover which can overlie a lower member having the grill for supporting food items to be barbecued, the cover being in a location such that it presents a smoking region above the food items for smoking the food items, so that the barbecue unit has all the advantages of conventional barbecue units but can be more readily stored in a minimum of space in a manner not capable of being accomplished with conventional barbecue units.

Other objects of this invention will become apparent as the following specification progresses, reference being had to the accompanying drawing for an illustration of the invention.

Figure 1:
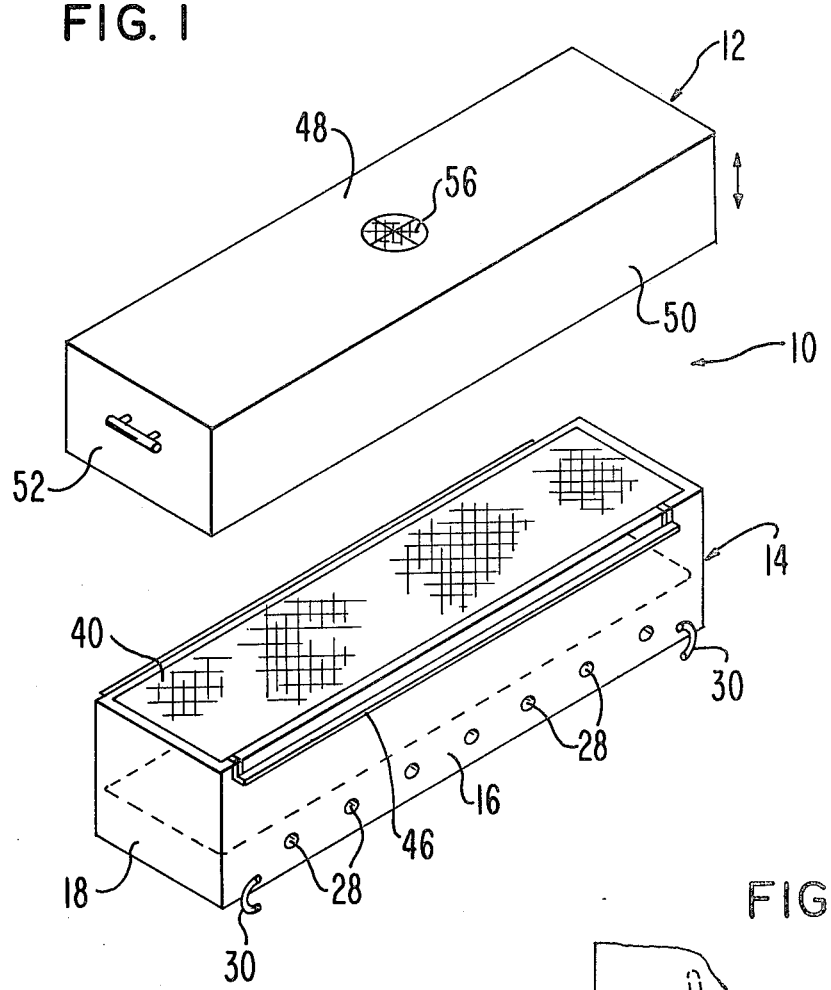
FIG. 1 is a perspective view of the improved barbecue unit of the present invention, the cover of the unit being separated from the lower member thereof to illustrate details of construction.

The barbecue unit of the present invention is broadly denoted by the numeral 10 and is shown in FIG. 1 as being comprised of a cover 12 and a lower member 14. Cover 12 and member 14 are shown as being rectangular in plan form and in side elevation. Cover 12 generally has the same shape as member 14 so that the cover can fit snugly over member 14 in the manner shown in FIG. 2 for purposes of storage so that the barbecue unit will take up a minimum of space when stored. While cover 12 and member 14 are shown as being rectangular, they could be square or possibly circular, if desired. Thus, barbecue unit 10 is not limited to the specific shape shown in FIGS. 1-2.

Figure 1A:
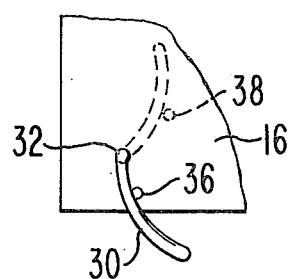
FIG. 1a is a vertical section of the barbecue unit with the cover in a position for smoking food on the upper grill of the lower member.
Figure 2:
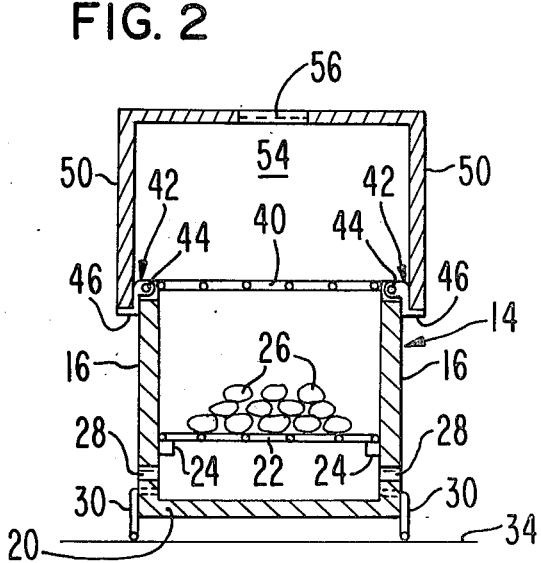
FIG. 2 is a view similar to FIG. 1a but showing the barbecue unit in a collapsed condition for storage.

Lower member 14 has a box-like configuration in that it has a pair of opposed, generally parallel sides 16 and a pair of opposed, generally parallel ends 18 interconnecting sides 16. Member 14 also has a bottom 20 (FIGS. 1a and 3) which spans the distance between sides 16 and ends 18. A lower grill 22 is mounted in any suitable manner within member 14 above bottom 20 and between sides 16 as shown in FIGS. 1a and 2. Grill 22 is supported in any suitable manner, such as on a number of spaced lugs 24 secured to the inner surfaces of sides 16. Grill 22 is adapted to support a number of charcoal briquettes 26 which are ignited to provide the source of heat for barbecue unit 10.

To allow for an adequate supply of combustion air within lower member 14, sides 16 are provided with a number of spaced air holes 28 therethrough. The sides 16 can be provided with sliding gates (not shown) which permit adjustment of the size of air holes 28 so that a greater or lesser amount of air can flow into the region below grill 22 for use as combustion air.

Lower member 14 has four legs 30 pivotally mounted by pins 32 to respective sides 16, there being a leg 30 for each corner, respectively, of the lower member 14. Each of these legs can pivot from the dashed-line, retracted position of FIG. 3 to the full line position in which each leg projects downwardly from bottom 20 and is adapted to engage a support surface 34. Each leg is held in its full line, operative position shown in FIG. 3 by a pin 36 which projects laterally from the respective side 16. Pins 36 cause the legs to be held in fixed positions yet the legs can properly support lower member 34 on surface 34 with bottom 20 spaced above surface 34. When it is desired to retract a leg 30, it is manually rotated in a clockwise sense when viewing FIG. 3 into the dashed line position and against a second pin 38 also projecting laterally from the respective site 16. Structure other than pins 36 and 38 can be used, if desired, to limit the pivotal movements of legs 30.

The upper end of member part 14 is provided with a second grill 40 which is secured in any suitable manner to the lower member 14. The grill can merely rest on the top surfaces of sides 16 or can rest on lugs (not shown) similar to lugs 24 but secured to the upper, inner surfaces of sides 16. Grill 40 is adapted to support items of foods which are to be barbecued by barbecue unit 10.

Lower member 14 also has a pair of elongated, rigid bars 42 pivotally mounted on the upper ends of sides 16 as shown in FIGS. 1-2. Each bar is transversely L-shaped as shown in FIGS. 1a and 2 and is pivotally mounted at each end by a pin 44 to the respective side 16. Each bar 42 has two positions, including a first, operative position shown in FIGS. 1 and 1a and a retracted or stored position shown in FIG. 2. In their operative positions, the bars have horizontal, laterally projecting parts 46 which are horizontally aligned with each other as shown in FIG. 1a. In the retracted or stored position of FIG. 2, bars 42 extend upwardly from respective sides 16, and parts 46 extend horizontally in a common plane above the plane of grill 40.

Cover 12 has a top wall 48, a pair of spaced, generally parallel end walls 58 and a pair of spaced generally parallel end walls 52. The distance between side walls 50 is just slightly greater than the distance between sides 16 of lower member 14 as shown in FIGS. 1a and 2. This permits cover 12 to be readily fitted over lower member 14 for storage purposes as shown in FIG. 2. The cover can also be supported by rigid bars 42 in the manner shown in FIG. 1a when it is desired to smoke the food items on grill 40. When cover 12 is in the elevated, supported position of FIG. 1a, the cover forms a space 54 above grill 40 in which smoke can be concentrated for smoking the food on grill 40. Cover 12 also has an adjustable air vent 56 on top wall 48 thereof.

Figure 3:
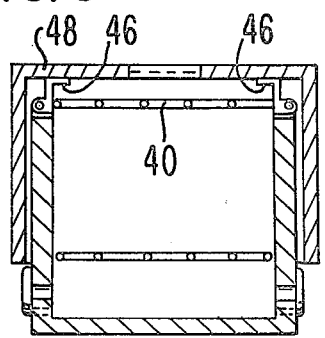
FIG. 3 is an enlarged, fragmentary, side elevational view of the barbecue unit showing a swingable leg at one corner of the lower member.

In use, assuming cover 12 is in the collapsed or stored position on lower member 14 as shown in FIG. 2, the user removes the barbecue unit from a shelf of other storage location and lowers the legs to the operative positions shown in FIG. 3. Then the barbecue unit is placed on a support surface 34 and cover 12 is removed. Charcoal briquettes 26 are placed in lower part 14 on grill 22 and ignited and grill 40 is then placed on the upper end of lower member 14 so as to support food items to be barbecued.

The food can be barbecued without cover 12 over grill 40. However, if it is desired to smoke the food items on grill 40, rigid bars 42 are rotated into the operative positions thereof shown in FIG. 1a, thereby placing parts 46 in horizontal positions. Then, the cover 12 is placed over grill 40 so that the cover is supported by parts 46 as shown in FIG. 1a. The space 54 above grill 40 can then be used to concentrate the smoke onto the food items on the grill and the amount of smoke can be adjusted by adjusting air vent 56 on top wall 48 of cover 12.

Following use of barbecue unit 10, and after it has cooled to air temperature can be put in a stored condition in the manner shown in FIG. 2 quickly and easily. To do this, cover 12 separated from lower part 14, legs 30 and bars 42 are retracted, and cover 12 is put into place over lower member 14 as shown in FIG. 2. Then, the barbecue unit, in its collapsed condition, can be placed on a shelf or other location of limited space until further use.

What is claimed is:

1. A barbecue unit comprising: a lower member having a rectangular open top and a grill extending across the open top thereof, the grill being adapted to support food items to be barbecued, the lower member having means therein for supporting charcoal briquettes which serve as source of heat; a hollow cover collapsible over the lower member in covering relationship to the open top thereof; and a pair of elongated bars pivotally mounted on respective sides of the lower member at the upper margin thereof, each bar having a lateral flange for removably supporting the lower margin of the cover in an elevated position on the lower member to present a smoking region above the grill, the bars being pivotal into retracted positions on the grill to permit the cover to telescope over the lower member.

2. A barbecue unit as set forth in claim 1, wherein each bar is transversely L-shaped.

3. A barbecue unit as set forth in claim 1, wherein the lower member has a number of pivotally mounted legs thereon, each leg being movable from a first, operative position supporting the lower member above a support surface to a second, retracted position.

4. A barbecue unit as set forth in claim 3, wherein each leg has means for limiting the pivotal movement thereof relative to the lower member.

* * * * *